(12) United States Patent
Miranda et al.

(10) Patent No.: US 9,828,915 B2
(45) Date of Patent: Nov. 28, 2017

(54) HOT GAS PATH COMPONENT HAVING NEAR WALL COOLING FEATURES

(71) Applicant: General Electric Company, Schenectady, NY (US)

(72) Inventors: Carlos Miguel Miranda, Greer, SC (US); Srikanth Chandrudu Kottilingam, Simpsonville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 14/739,849

(22) Filed: Jun. 15, 2015

(65) Prior Publication Data

US 2016/0363054 A1   Dec. 15, 2016

(51) Int. Cl.
*F01D 5/18* (2006.01)
*F02C 7/18* (2006.01)
*B23P 15/04* (2006.01)

(52) U.S. Cl.
CPC ............... *F02C 7/18* (2013.01); *B23P 15/04* (2013.01); *F01D 5/187* (2013.01); *F01D 5/188* (2013.01); *F01D 5/18* (2013.01); *F01D 5/182* (2013.01); *F01D 5/184* (2013.01); *F01D 5/186* (2013.01); *F05D 2230/236* (2013.01); *F05D 2230/237* (2013.01); *F05D 2260/204* (2013.01); *F05D 2300/608* (2013.01); *F05D 2300/701* (2013.01); *Y02T 50/672* (2013.01); *Y02T 50/676* (2013.01)

(58) Field of Classification Search
CPC . F01D 5/18; F01D 5/182; F01D 5/184; F01D 5/186; F01D 5/187; F01D 5/188; F05D 2260/204
See application file for complete search history.

(56) References Cited

U.S. PATENT DOCUMENTS

| 4,142,824 A | 3/1979 | Andersen |
| 4,270,883 A | 6/1981 | Corrigan |

(Continued)

FOREIGN PATENT DOCUMENTS

| EP | 0 227 580 A2 | 7/1987 |
| EP | 2 381 070 A2 | 10/2011 |

(Continued)

OTHER PUBLICATIONS

Extended European Search Report and Opinion issued in connection with related EP Application No. 16173820.8 dated Nov. 11, 2016.

(Continued)

*Primary Examiner* — Woody Lee, Jr.
*Assistant Examiner* — Behnoush Haghighian
(74) *Attorney, Agent, or Firm* — Armstrong Teasdale LLP

(57) ABSTRACT

A method for providing micro-channels in a hot gas path component includes forming a first micro-channel in an exterior surface of a substrate of the hot gas path component. A second micro-channel is formed in the exterior surface of the hot gas path component such that it is separated from the first micro-channel by a surface gap having a first width. The method also includes disposing a braze sheet onto the exterior surface of the hot gas path component such that the braze sheet covers at least of portion of the first and second micro-channels, and heating the braze sheet to bond it to at least a portion of the exterior surface of the hot gas path component.

20 Claims, 9 Drawing Sheets

(56) References Cited

U.S. PATENT DOCUMENTS

| | | |
|---|---|---|
| 4,526,512 A | 7/1985 | Hook |
| 5,062,768 A | 11/1991 | Marriage |
| 5,263,820 A | 11/1993 | Tubbs |
| 5,640,767 A | 6/1997 | Jackson et al. |
| 5,660,524 A | 8/1997 | Lee et al. |
| 6,383,602 B1 | 5/2002 | Fric et al. |
| 6,896,036 B2 | 5/2005 | Schneiders et al. |
| 6,921,014 B2 | 7/2005 | Hasz et al. |
| 6,942,449 B2 | 9/2005 | Boyer |
| 7,364,405 B2 | 4/2008 | Cunha et al. |
| 7,549,844 B2 | 6/2009 | Liang |
| 7,621,718 B1 | 11/2009 | Liang |
| 8,070,436 B2 | 12/2011 | Mitchell |
| 8,070,441 B1 | 12/2011 | Liang |
| 8,167,559 B2 | 5/2012 | Liang |
| 8,176,720 B2 | 5/2012 | Beeck |
| 8,317,475 B1 | 11/2012 | Downs |
| 8,414,263 B1 | 4/2013 | Liang |
| 8,491,264 B1 | 7/2013 | Liang |
| 8,561,411 B2 | 10/2013 | DiBenedetto |
| 8,578,720 B2 | 11/2013 | Ebert et al. |
| 8,651,805 B2* | 2/2014 | Lacy ............... F01D 5/186 415/178 |
| 8,807,943 B1 | 8/2014 | Liang |
| 9,206,696 B2* | 12/2015 | Bunker ............... F01D 5/187 |
| 9,435,208 B2 | 9/2016 | Bunker |
| 9,458,725 B2* | 10/2016 | Morgan ............... F01D 5/18 |
| 9,476,306 B2* | 10/2016 | Bunker ............... F01D 5/187 |
| 2010/0183428 A1* | 7/2010 | Liang ............... F01D 5/187 415/115 |
| 2011/0110771 A1* | 5/2011 | Morgan ............... F01D 5/147 415/177 |
| 2011/0259017 A1 | 10/2011 | Lacy et al. |
| 2012/0111545 A1* | 5/2012 | Bunker ............... B23P 15/04 165/133 |
| 2012/0124832 A1* | 5/2012 | Bunker ............... F01D 5/147 29/888 |
| 2012/0255870 A1* | 10/2012 | Rebak ............... F01D 5/147 205/670 |
| 2012/0276308 A1* | 11/2012 | Rebak ............... F01D 5/184 428/34.1 |
| 2012/0328451 A1* | 12/2012 | Lomas ............... F01D 5/187 416/97 R |
| 2013/0086784 A1* | 4/2013 | Bunker ............... C23C 4/00 29/402.03 |
| 2013/0101761 A1* | 4/2013 | Bunker ............... F01D 5/288 428/34.1 |
| 2014/0004310 A1 | 1/2014 | Rebak et al. |
| 2014/0110559 A1 | 4/2014 | Lee et al. |
| 2015/0086408 A1* | 3/2015 | Kottilingam ............... B22F 5/04 419/5 |
| 2015/0096305 A1 | 4/2015 | Morgan et al. |
| 2015/0251280 A1* | 9/2015 | Bunker ............... C23C 4/00 29/402.18 |
| 2016/0339544 A1* | 11/2016 | Xu ............... B23K 35/3033 |

FOREIGN PATENT DOCUMENTS

| | | |
|---|---|---|
| EP | 2 518 270 A2 | 10/2012 |
| EP | 2 540 971 A1 | 1/2013 |
| EP | 2 853 323 A2 | 4/2015 |
| GB | 803 650 A | 10/1958 |
| GB | 2 260 166 A | 4/1993 |
| WO | 2015/035363 A1 | 3/2015 |

OTHER PUBLICATIONS

Extended European Search Report and Opinion issued in connection with related EP Application No. 16174145.9 dated Nov. 14, 2016.

Extended European Search Report and Opinion issued in connection with corresponding EP Application No. 16174266.3 dated Nov. 18, 2016.

Extended European Search Report and Opinion issued in connection with related EP Application No. 16174149.1 dated Dec. 6, 2016.

U.S. Appl. No. 14/739,727, filed Jun. 15, 2015, Miranda, et al.
U.S. Appl. No. 14/739,791, filed Jun. 15, 2015, Miranda, et al.
U.S. Appl. No. 14/739,944, filed Jun. 15, 2015, Lacy, et al.

* cited by examiner

HOT GAS PATH COMPONENT HAVING NEAR WALL COOLING FEATURES

FEDERAL RESEARCH STATEMENT

The subject matter of this disclosure was made with Government support under Contract No. DE-FC26-05NT42643, awarded by the Department of Energy (DOE), and the Government has certain rights in the subject matter claimed herein.

BACKGROUND

The field of the present disclosure relates generally to turbine engines, and more particularly to hot gas path components having near wall cooling features.

Gas turbine systems are widely utilized in fields such as power generation. A conventional gas turbine system includes a compressor, a combustor, and a turbine. During operation of the gas turbine system, various hot gas path components in the system are subjected to high temperature flows, which can cause the hot gas path components to fail. Since higher temperature flows generally result in increased performance, efficiency, and power output of the gas turbine system and are thus desired in a gas turbine system, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of gas turbine buckets and nozzles often require complex cooling schemes in which air, typically bleed air, is forced through internal cooling passages within the airfoil and then discharged through cooling holes at the airfoil surface to transfer heat from the hot gas path component. Cooling holes can also be configured so that cooling air serves to film cool the surrounding surface of the hot gas path component.

Various strategies are known in the art for cooling the hot gas path components that are subjected to high temperature flows. For example, a series of internal cooling passages may be formed in a hot gas path component to facilitate cooling the hot gas path components. Buckets and nozzles formed by casting processes require cores to define the internal cooling passages. The cores and their potential for shifting during the casting process limits the extent to which a conventional casting process can locate a cooling passage in proximity to an exterior surface of the hot gas path component. As a result, cooling passages are typically about 0.1 inch (about 2.5 millimeters) or more below a base metal surface of a cast turbine bucket or nozzle. However, the heat transfer efficiency could be significantly increased if the cooling passages could be placed closer to the surface. The smaller cooling passages, or micro-channels, present a considerable fabrication challenge for cores and castings, which can significantly increase the manufacturing cost of the hot gas path components using such known near wall cooling systems.

BRIEF DESCRIPTION

In one aspect, a method of providing micro-channels in a hot gas path component is provided. The hot gas path component includes a substrate having an exterior surface. The method includes forming a first micro-channel in the exterior surface of the hot gas path component. The method also includes forming a second micro-channel in the exterior surface of the hot gas path component such that the second micro-channel is separated from the first micro-channel by a surface gap having a first width. The method includes disposing a braze sheet onto the exterior surface of the hot gas path component such that the braze sheet covers at least of portion of the first and second micro-channels. Furthermore, the method includes heating the braze sheet to bond it to at least a portion of the exterior surface of the hot gas path component.

In another aspect, a hot gas path component includes a substrate having a recess surface. A first micro-channel is formed in the recess surface. A second micro-channel is formed in the recess surface and separated from the first micro-channel by a surface gap having a first width. The hot gas path component also includes a braze sheet bonded to at least a portion of the recess surface. In addition, the braze sheet covers at least a portion of the first and second micro-channels.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
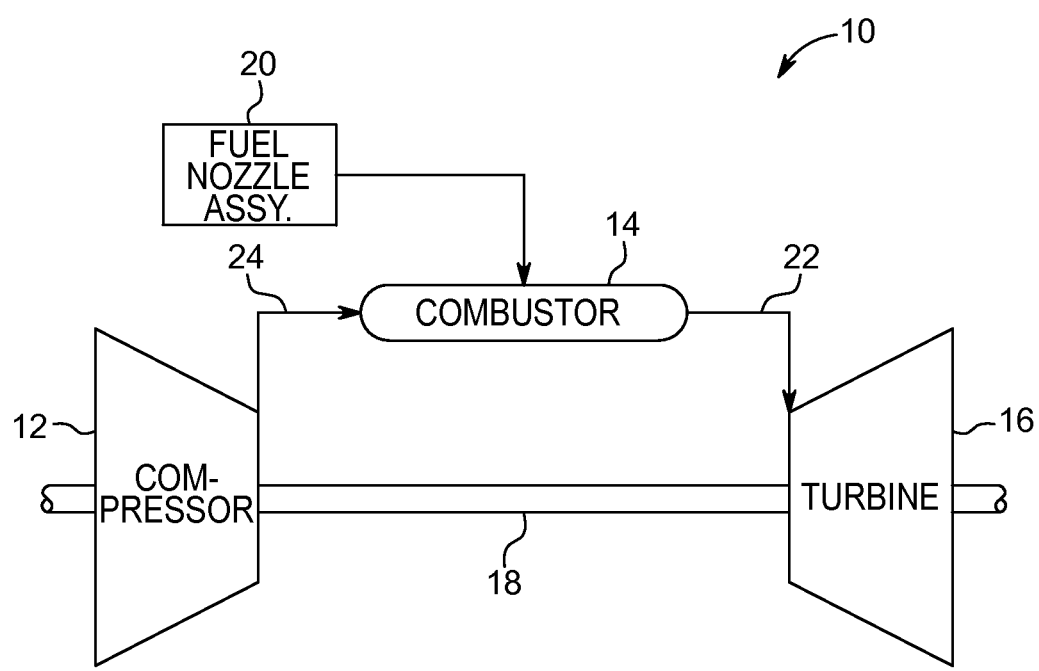
FIG. 1 is a schematic view of an exemplary gas turbine engine.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed vanes or blades (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. In alternative embodiments, rotatable shaft 18 is a plurality of shaft segments coupled together to form rotatable shaft 18. In the exemplary embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
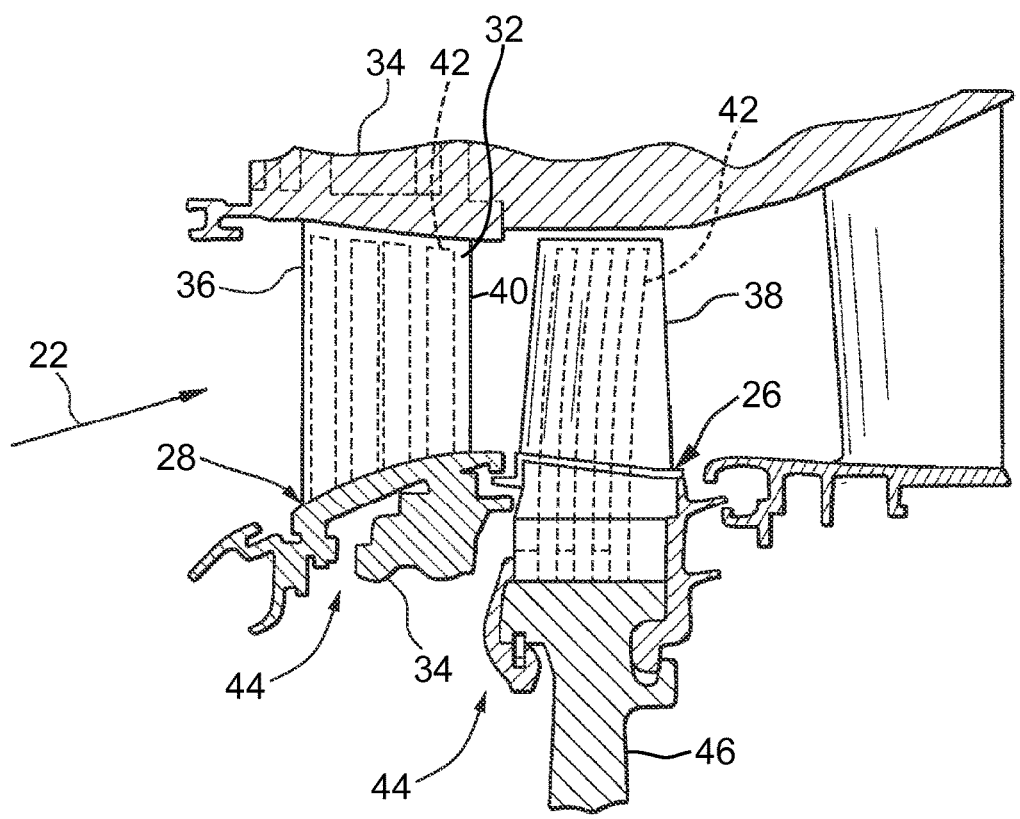
FIG. 2 is a schematic view of a portion of a turbine of the gas turbine engine shown in FIG. 1.

FIG. 2 is a schematic view of a portion of turbine 16 of gas turbine engine 10 shown in FIG. 1. In the exemplary embodiment, turbine 16 includes a turbine blade 26 and a stator vane 28. As described herein, stator vane 28 will be referred to as a hot gas path component 28. An airfoil 32 used with hot gas path component 28 includes a leading edge 36 that is directly exposed to hot gas flow 22. In addition, airfoil 32 includes a trailing edge 40 axially opposite leading edge 36. Hot gas path component 28 may be cooled by air routed from one or more stages of compressor 12 through a casing 34 of gas turbine engine 10. An airfoil 38 used with turbine blade 26 is also directly exposed to hot gas flow 22. Turbine blade 26 may also be cooled by pressurized air 24 routed from one or more stages of compressor 12 through casing 34 of gas turbine engine 10.

While a stator vane is described herein, hot gas path component 28 is any component of gas turbine engine 10 that is at least partially exposed to hot gas flow 22 through gas turbine engine 10, e.g., where the hot gas flow 22 operating temperature, in one example, is above 2500 degrees Fahrenheit (° F.) (~1371 degrees Celsius (° C.)). For example, hot gas path component 28 includes, without limitation, turbine blade 26 and other bucket assemblies (also known as blades or blade assemblies), nozzle assemblies (also known as vanes or vane assemblies), shroud assemblies, transition pieces, retaining rings, and compressor exhaust components. Hot gas path component 28 is not limited to the examples described above, but is any component that is at least partially exposed to hot gas flow 22. In addition, hot gas path component 28 is not limited to components of gas turbine engine 10, but may be any type of component that is exposed to high temperature flows. It should be understood that the description and figures that utilize a turbine, an airfoil, and a micro-channel are exemplary only. Additionally, it should be understood that the micro-channels described herein may be used in any suitable component through which a cooling fluid such as, water, steam, air, fuel and/or any other suitable fluid is directed for cooling the component and/or for maintaining a temperature of the component.

In the exemplary embodiment, pressurized air 24 is described as the cooling fluid used to cool the components exposed to hot gas flow 22, e.g., turbine blade 26 and hot gas path component 28. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the exemplary embodiment, at least one cooling system 42 is defined in hot gas path component 28 and is coupled in flow communication with a cooling fluid supply conduit 44 formed in casing 34. In the exemplary embodiment, cooling fluid supply conduit 44 is fluidly connected to compressor 12.

In operation, gas turbine engine 10 ingests air into compressor 12. Compressor 12, rotating at a high rotational speed compresses or pressurizes the air and channels a portion of pressurized air 24 to combustor 14 and a portion of pressurized air 24 to other areas of gas turbine engine 10 for use in cooling components exposed to heat generated by gas turbine engine 10. Pressurized air 24 is mixed with fuel in combustor 14 and ignited to generate hot gas flow 22. Hot gas flow 22 is channeled from combustor 14 toward turbine 16 where hot gas flow 22 passes over hot gas path component 28 and impacts turbine blade 26 connected to a rotor wheel 46. Rotor wheel 46 is rotated by hot gas flow 22 impacting turbine blade 26. Hot gas flow 22 also transfers heat to hot gas path component 28 and turbine blade 26. A portion of pressurized air 24 is channeled through cooling system 42 formed in at least hot gas path component 28 to facilitate cooling the component.

Figure 3:
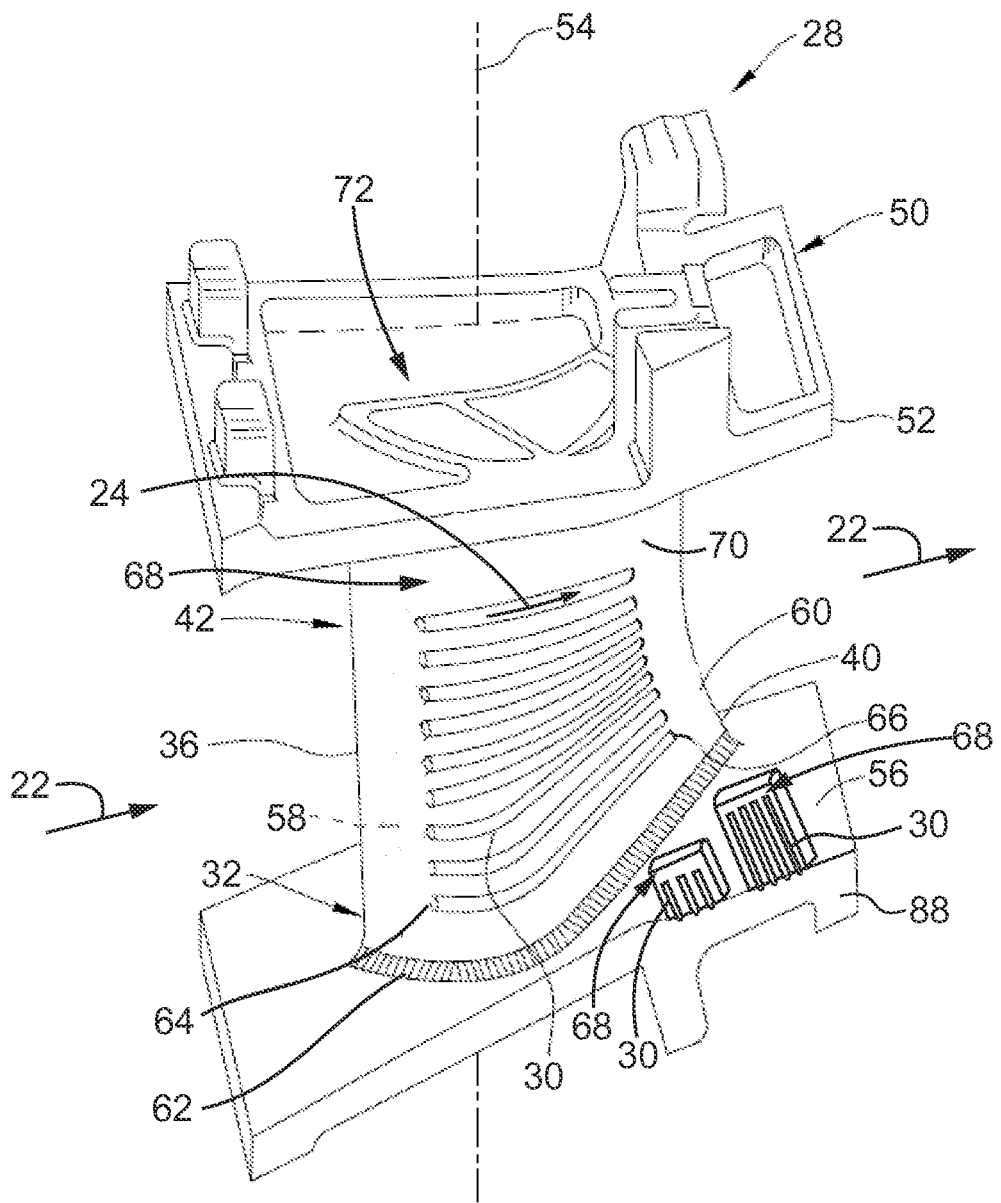
FIG. 3 is a perspective view of a hot gas path component of the turbine shown in FIG. 2, illustrating a plurality of micro-channels formed in an airfoil.
Figure 4:
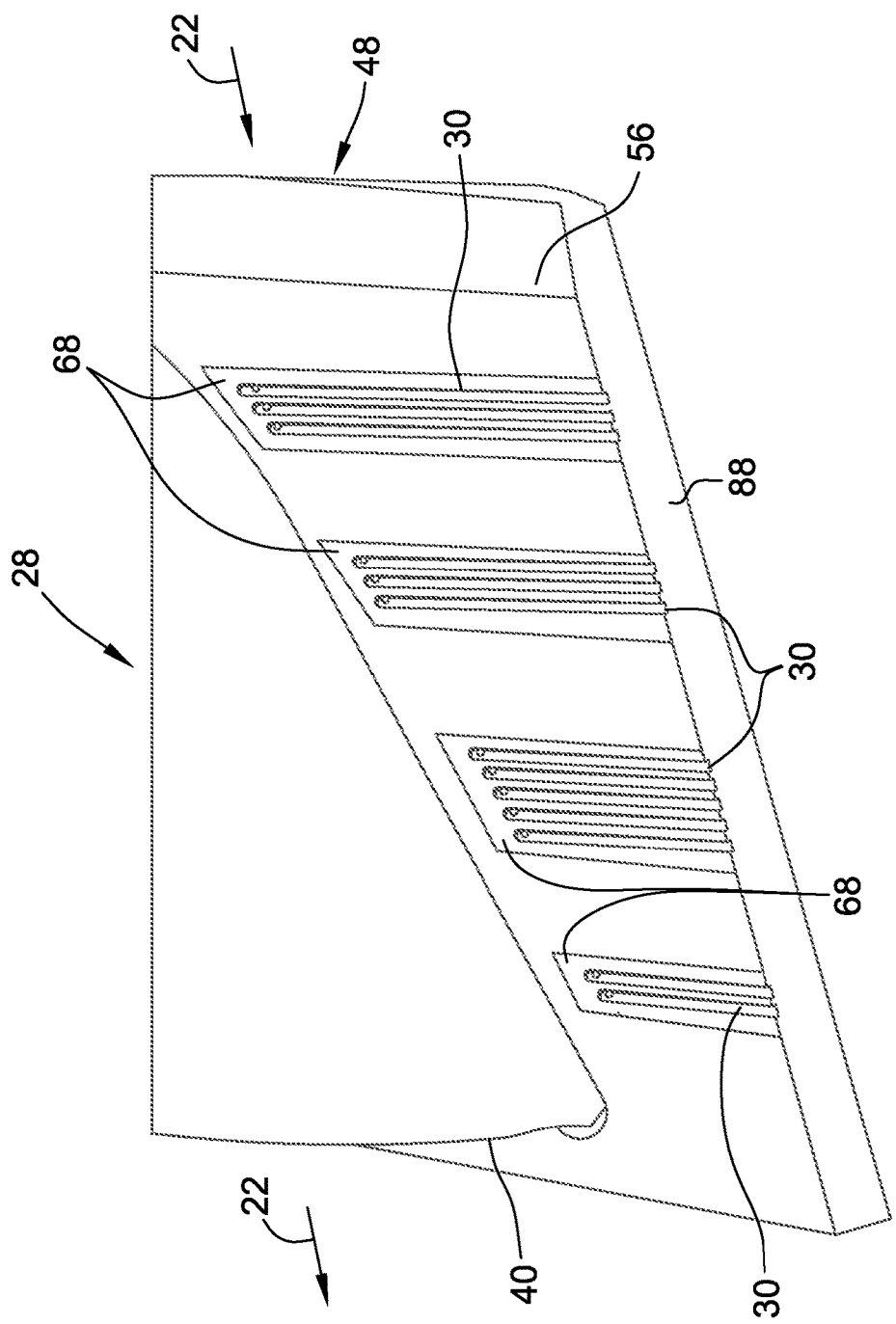
FIG. 4 is a partial cut-away view of the hot gas path component shown in FIG. 3, illustrating the plurality of micro channels formed in a base of the hot gas path component.

FIG. 3 is a perspective view of hot gas path component 28 shown in FIG. 2, illustrating a plurality of micro-channels 30 formed in airfoil 32 and a base 48 of component 28. FIG. 4 is a partial cut-away view of hot gas path component 28 shown in FIG. 3, illustrating the plurality of micro channels 30 formed in base 48. In the exemplary embodiment, hot gas path component 28 includes a hook portion 50 with airfoil 32 extending from a substantially flat first platform 52. Hook portion 50 facilitates securing hot gas path component 28 to gas turbine engine 10 (shown in FIG. 1). First platform 52 forms a radial boundary for hot gas flow 22 flowing through turbine 16 (shown in FIG. 1) of gas turbine engine 10. In the exemplary embodiment, airfoil 32 is at least partially hollow and extends generally along a radial axis 54 from first platform 52 to base 48, which includes a second platform 56 positioned opposite first platform 52 and forming another radial boundary for hot gas flow 22. Airfoil 32 includes a concave pressure side surface 58 and an opposite convex suction side surface 60 that each extend between leading edge 36 and trailing edge 40.

In the exemplary embodiment, hot gas path component 28 includes cooling system 42 that extends within the partially hollow airfoil 32 to enable pressurized air 24 to be channeled through and/or within airfoil 32. Cooling system 42 includes the plurality of micro-channels 30 that extend from one or more inlet passages 64 to one or more outlet passages 66 of airfoil 32. In the exemplary embodiment, micro-channels 30 formed in airfoil 32 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 64 may be individually coupled in flow communication to airfoil 32 or may be coupled in flow communication to a common trough or plenum 84 (not shown in FIG. 3). Outlet passages 66 may individually exhaust pressurized air 24 through film cooling holes 86 (not shown in FIG. 3), may be coupled in flow communication to a common trough or plenum 84 (not shown in FIG. 3).

In the exemplary embodiment, hot gas path component 28 includes one or more pockets or recesses 68 formed in an outer surface of hot gas path component 28. Micro-channels 30 are formed in a bottom surface 70 of each of recesses 68 and are covered by a braze sheet or pre-sintered preform (PSP) 80 (not shown in FIGS. 3-4). In the exemplary embodiment, recesses 68 are formed in hot gas path component 28 during the forming or casting of substrate 74. Alternatively or in addition, after casting hot gas path component 28, recesses 68 are finished machined into outer surface 76 of substrate 74. One or more recesses 68 are formed using, for example, without limitation, electro-discharge machining (EDM) or any conventional machining method that enables recesses 68 to be formed as described herein. Recesses 68 have a depth or are offset from outer surfaces 76 of hot gas path component 28 a predefined, substantially uniform distance such that bottom surface 70 of recesses 68 conforms to the shape of the outer surface of hot gas path component 28. For example, without limitation, a recess 68 formed in convex suction side surface 60 of airfoil 32 conforms to the airfoil surface shape and is offset a predefined distance substantially equal to a thickness of braze sheet 80. Thus, the original airfoil shape and surface location is established by the application of braze sheet 80 to recess 68. While hot gas path component 28 is described as including recesses 68, it is contemplated that a recess 68 can include the entire outer surface 76 of hot gas path component 28. That is, hot gas path component 28 can be formed such that braze sheet 80 covers substantially the entire outer surface 76 of hot gas path component 28. In such an embodiment, a discrete recess 68 may not be formed in outer surface 76, but rather, outer surface 76 may be recessed a predefined distance below a finished outer profile of hot gas path component 28.

In the exemplary embodiment, hot gas path components 28 can be securely coupled to casing 34 (shown in FIG. 2). When assembled, hot gas path components 28 form an array of vanes that extend circumferentially about a hot gas flow path of turbine 16. Alternatively, when hot gas path component 28 is a turbine blade, hot gas path components 28 form an array of vanes that extend circumferentially about rotor wheel 46 (shown in FIG. 2).

In the exemplary embodiment, hot gas path component 28 may be fabricated unitarily, for example, by casting of a suitable superalloy capable of withstanding the temperatures and stresses generated within turbine 16. As described herein, airfoil 32 is a least partially hollow and includes internal cooling system 42. Hot gas path component 28 includes a plurality of inlet apertures 72 that extend longitudinally through hot gas path component 28 and are coupled in flow communication with cooling system 42 formed in airfoil 32. Pressurized air 24 bled from compressor 12 is channeled through cooling fluid supply conduit 44 and into inlet apertures 72 to provide pressured air 24 to airfoil 32.

Figure 5:
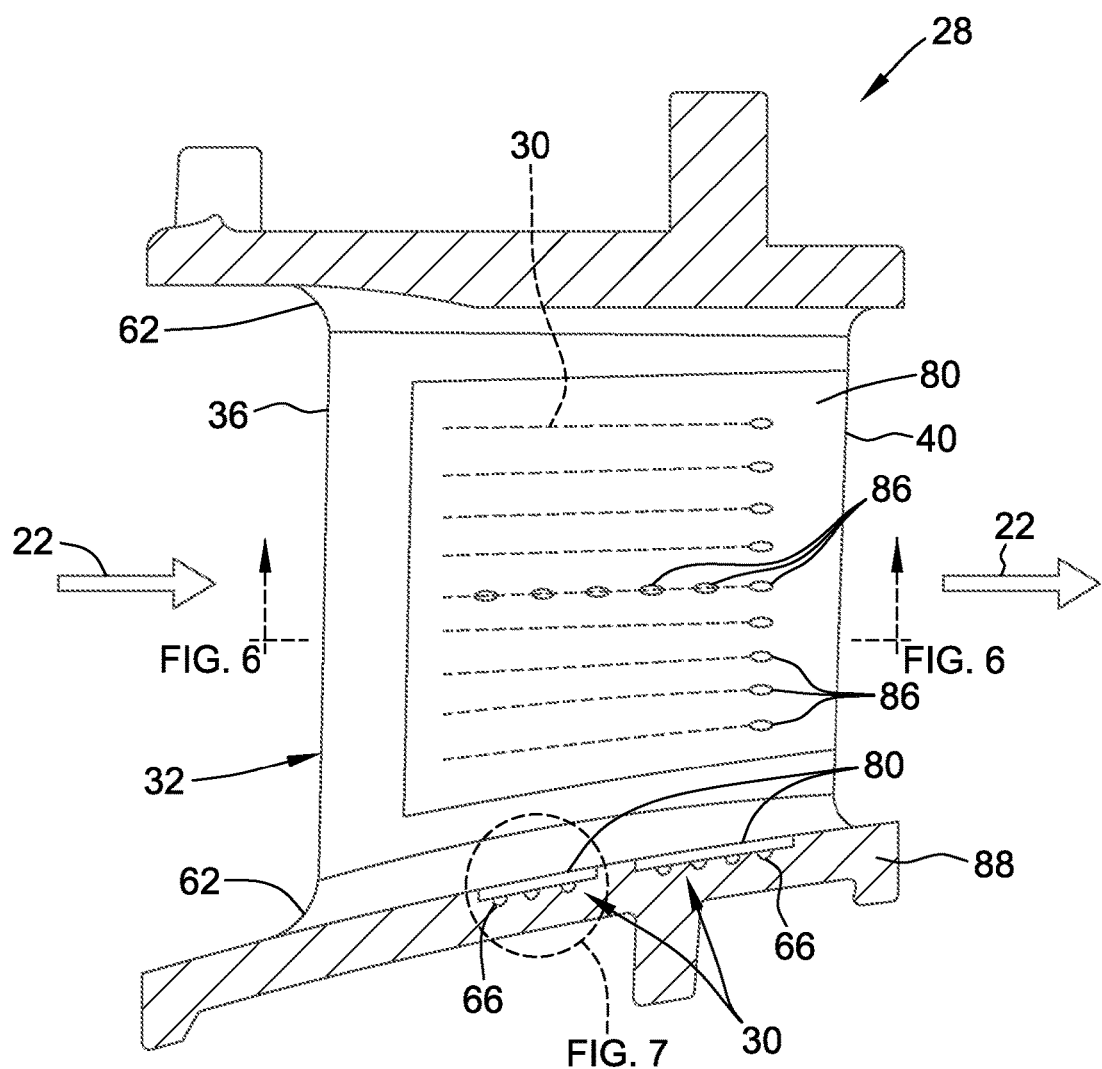
FIG. 5 is a schematic end view of the hot gas path component shown in FIG. 3 for use in the gas turbine engine of FIG. 1, including a cooling system formed therein.
Figure 6:
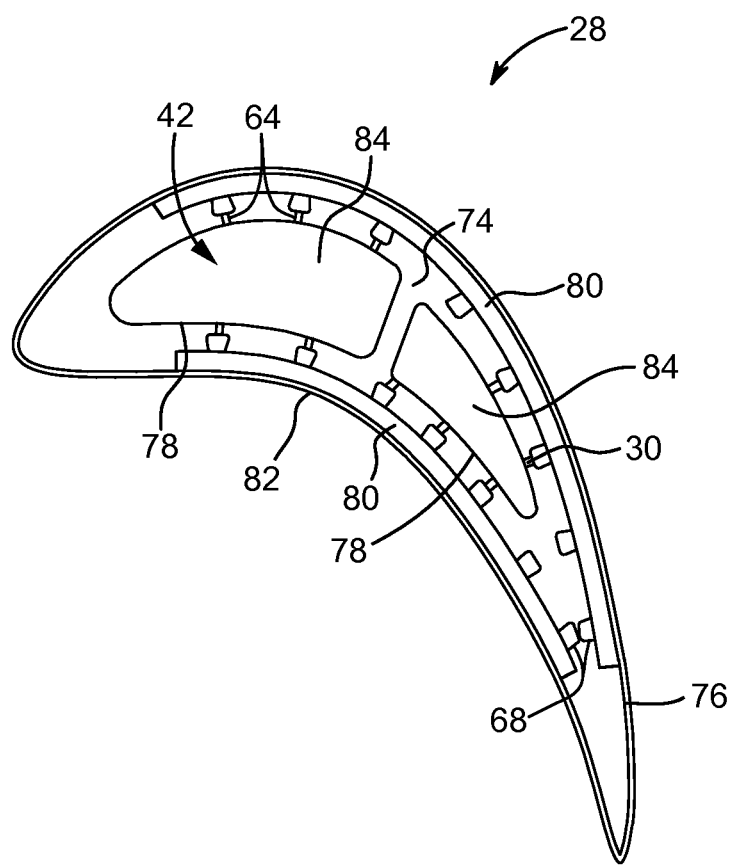
FIG. 6 is a schematic cross-section of the hot gas path component 28 of FIG. 5, including the cooling system.
Figure 7:
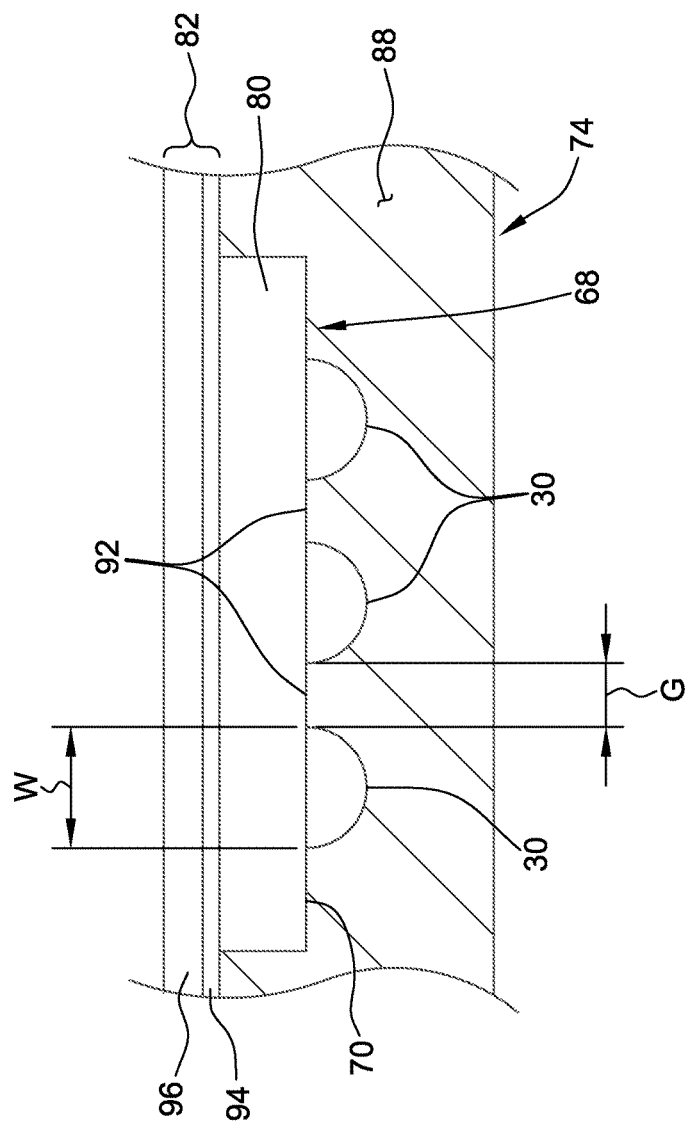
FIG. 7 is an enlarged view of a portion of the hot gas path component shown in FIG. 5.

FIG. 5 is a schematic end view of hot gas path component 28 shown in FIG. 3 for use in gas turbine engine 10 of FIG. 1, and including cooling system 42 formed therein. FIG. 6 is a schematic cross-section of hot gas path component 28 of FIG. 5 including cooling system 42 formed therein. FIG. 7 is an enlarged view of a portion of hot gas path component 28 shown in FIG. 5. When hot gas path component 28 is exposed to a hot gas flow 22, hot gas path component 28 is heated by hot gas flow 22 and can reach a temperature at which hot gas path component 28 may rapidly deteriorate. Cooling system 42 for hot gas path component 28 enables gas turbine engine 10 to function with hot gas flow 22 at an increased temperature, which increases the efficiency and performance of gas turbine engine 10.

In the exemplary embodiment, as described herein, cooling system 42 includes a series of small grooves, or micro-channels 30, formed in a substrate 74 of hot gas path component 28. As used herein, "small" or "micro" channel dimensions include a width in the range between approximately 0.010 inches (in.) (0.25 millimeters (mm)) and approximately 0.100 in. (2.54 mm). Substrate 74 includes an outer surface 76 and an inner surface 78. In addition, substrate 74 includes one or more recesses 68 formed in outer surface 76. In the exemplary embodiment, micro-channels 30 are formed in recesses 68 of substrate 74. In some embodiments, micro-channels 30 are at least partially formed during the casting of hot gas path component 28.

In the exemplary embodiment, hot gas path component 28 is formed by a casting process such as, but not limited to, an investment casting process, and is fabricated from any suitable material depending on the intended application for hot gas path component 28. For example, without limitation, hot gas path component 28 can be formed from Ni-base, Co-base, and Fe-base superalloys and the like. Some Ni-base superalloys are known to be advantageous because of a combination of desirable properties including high temperature strength and high temperature creep resistance. The material used to form substrate 74 may also include a NiAl intermetallic alloy, as these alloys are also known to possess a combination of superior properties including high temperature strength and high temperature creep resistance that are advantageous for use in turbine engine applications used for aircraft. In alternative embodiments, substrate 74 is formed from any material that enables substrate 74 to function as described herein.

After casting hot gas path component 28, micro-channels 30 are finished machined into outer surface 76 of substrate 74. One or more inlet passages 64 connecting micro-channels 30 to plenum 84 are drilled using, for example, without limitation, electro-discharge machining (EDM) or any conventional drilling method that enables inlet passages 64 to be formed as described herein.

In the exemplary embodiment, a plurality of micro-channels 30 are formed in outer surface 76 of substrate 74 by either a casting process or by a casting process and a finish machining process. In the exemplary embodiment, micro-channels 30 may be formed using a variety of techniques. For example, without limitation, techniques for forming micro-channels 30 include laser machining, water jet machining, electro-chemical machining (ECM), electro-discharge machining (EDM), photolithography, or any other process capable of providing micro-channels with proper sizes and tolerances. Is should be understood that the EDM process can include a multi-axis computer numerically controlled (CNC) unit. CNC units enable movement of the cutting tool along a number of axes, including X, Y, and Z axes, as well as rotational axes.

In the exemplary embodiment, micro-channels 30 are formed on any portion of outer surface 76 of hot gas path component 28, including, but not limited to first and second platforms 52, 56, concave pressure side surface 58, convex suction side surface 60, and fillets 62. In addition, micro-channels 30 can have any lengthwise configuration, for example, without limitation, straight, curved, or having multiple curves.

The cross section of micro-channels 30 and the spacing of micro-channels 30 determine the cooling efficiency of cooling system 42. As shown in FIG. 7, micro-channels 30 are separated from each other by gap 92 having a width "G". Width "W" is the dimension of micro-channels 30 that is producible in a reliable manner to facilitate preventing braze sheet 80 from drooping into micro-channel 30 at an operating temperature of hot gas path component 28. Width "G" is the dimension of gap 92 that facilitates providing the nearest spacing (i.e., highest density) of micro-channels 30 to facilitate optimize cooling efficiency of cooling system 42 while enabling braze sheet 80 to develop a braze bond to substrate 74 of hot gas path component 28. A computer model of hot gas path component 28 was developed to determine micro-channel 30 sizes, shape, and spacing to promote cooling efficiency. Simulation results and component testing indicate that micro-channel 30 widths "W" below about 0.08 inches (in.) (2.0 mm) and the gap 92 widths "G" approximately equal to or greater than width "W" demonstrate effective performance.

In the exemplary embodiment, width "W" of micro-channels 30 is approximately 0.060 in. (1.5 mm), having an acceptable deviation from the nominal width of about ±0.005 in. (0.13 mm). Furthermore, micro-channels 30 have a depth (not shown) that is approximately one-half width "W". Alternatively, micro-channels 30 can have any depth and width that enables micro-channels 30 to function as described herein. In the exemplary embodiment, micro-channels 30 are semicircular and width "W" is representative of a diameter dimension. In alternative embodiments, micro-channels 30 can have any cross-sectional shape that enables micro-channels 30 to function as described herein, for example, without limitation, square, rectangular, triangular, and semioval shapes. Furthermore, the shape and width of micro-channels 30 does not have to be constant along a length of the micro-channel. For example, micro-channels 30 can change in cross-sectional shape and size as determined to achieve cooling fluid flow and velocity parameters appropriate for a specific design. In addition, the depth of micro-channels 30 can also be varied. It is also contemplated that various micro-channels 30 have cross-sections with a certain geometric shape, while other micro-channels 30 have cross-sections with another geometric shape.

In the exemplary embodiment, micro-channel 30 can be generally straight, or can be generally curved, sinusoidal, or serpentine. Micro-channel 30 can be oriented such that pressurized air 24 flows through micro-channel 30 in any direction with respect to hot gas flow 22. For example, without limitation, pressurized air 24 can flow through micro-channel 30 or any portion thereof in a generally downstream direction with respect to hot gas flow 22, or in a generally upstream direction with respect to hot gas flow 22, or in any other direction with respect to the hot gas flow 22. In some embodiments, micro-channel 30 may be a singular, discrete micro-channel. In other embodiments, micro-channel 30, or any portion of micro-channel 30, may branch off from micro-channel 30 to form multiple micro-channel branches. It is contemplated that micro-channel 30, in some embodiments, wraps around the entire perimeter of hot gas path component 28, or wraps around only portions of the perimeter of hot gas path component 28. However, it is understood that each of micro-channels 30 generally do not intersect with any other micro-channel 30.

In the exemplary embodiment, gap 92 width "G" is approximately 0.060 in. (1.5 mm), having an acceptable deviation from the nominal width of about ±0.005 in. (0.13 mm). Alternatively, gap 92 can have any width that enables hot gas path component 28 to function as described herein. In the exemplary embodiment, gap 92 is configured to enable the largest number of micro-channels 30 to be formed in substrate 74 while leaving sufficient material between micro-channels 30 to enable braze sheets 80 to form an adequate braze bond with substrate 74.

Figure 8:
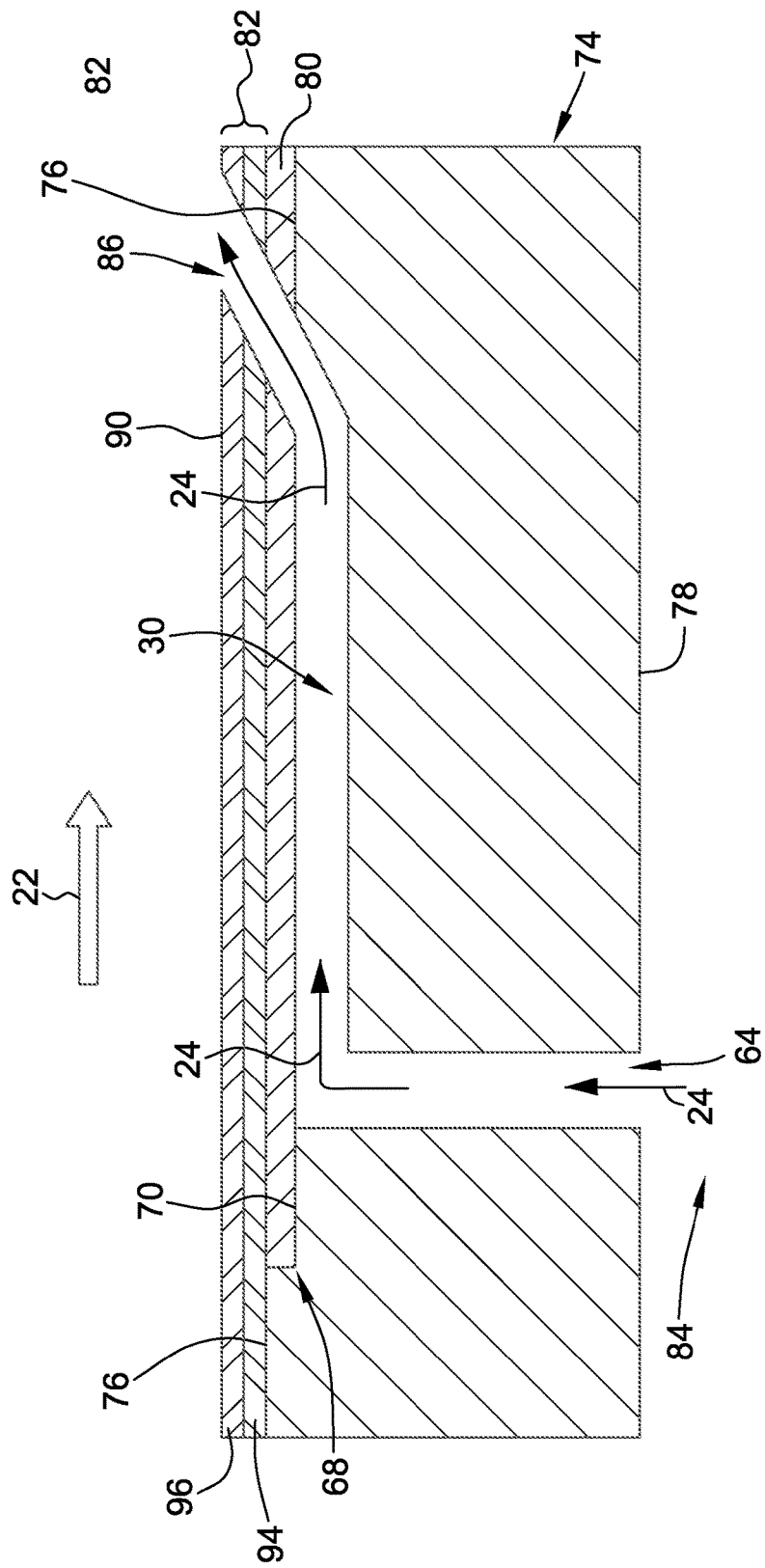
FIG. 8 is a schematic cross-section of one of the micro-channels shown in FIG. 5, illustrating the micro-channel channeling pressurized air from an inlet passage to a film cooling hole.

FIG. 8 is a schematic cross-section of one of micro-channels 30 shown in FIG. 5, illustrating micro-channel 30 directing pressurized air 24 from inlet passage 64 to a film cooling hole 86. In the exemplary embodiment, one or more covers or braze sheets 80, configured to cover at least a portion of micro-channels 30, are coupled to substrate 74 within each of recesses 68. Braze sheets 80 conform to the profile of outer surface 76 and cover micro-channels 30, thereby forming a plurality of cooling passages.

In the exemplary embodiment, braze sheet 80 is formed from any suitable material or combination of materials having the mechanical, thermal, and environmental characteristics required for hot gas path component 28, and is preferably a PSP material formed from a combined powder mixture of a high melting alloy powder and a low melting alloy powder. High melting alloy powders include, for example, without limitation, structural alloys and environmental coatings such as Inconel 738, Rene 142, Mar-M247, GT-33, and the like. Low melting alloy powders include, for example, without limitation, braze alloys such as D15, DF4B, BNi-9, BNi-5, B93, and the like. The proportion of low melting alloy powder may range from about 5% to about 95% by weight, and may transition from a higher proportion of low melting alloy powder near bottom surface 70 of recess 68 to a lower proportion of low melting alloy powder near outer surface 76 of substrate 74. The thickness of braze sheet 80 ranges from about 0.005 inch (0.125 mm) to about 0.5 inch (12.7 mm), but is preferably between about 0.01 inch (0.25 mm) to about 0.02 inch (0.5 mm). Braze sheet 80 may be formed as a flat sheet or contoured into any suitable geometry to conform to the shape of hot gas path component 28.

As shown in FIGS. 7 and 8, after the desired number of micro-channels 30 are formed, braze sheet 80 is bonded to substrate 74 at bottom surface 70 of recess 68 using any suitable bonding method. When braze sheet 80 is a PSP, braze sheet 80 may be bonded to substrate 74 by simultaneously heating braze sheet 80 and substrate 74 to a temperature greater than the melting point of the low melting alloy powder and less than the melting point of the high melting alloy powder in braze sheet 80, such that the low melting alloy powder becomes the bonding agent between braze sheet 80 and substrate 74.

Hot gas path component 28 includes a coating 82 formed over at least a portion of outer surface 76 and braze sheets 80, forming a protective material layer on hot gas path component 28. In the exemplary embodiment, coating 82 includes at least two material layers, for example, a bond coat 94 and a thermal barrier coating (TBC) 96. Bond coat 94 is any appropriate bonding material. For example, without limitation, bond coat 94 has a chemical composition MCrAl(X), where "M" is an element selected from the group consisting of Fe, Co, Ni, and various combinations thereof. "X" is an element selected from the group consisting of gamma prime formers, solid solution strengtheners, consisting of, for example, Ta, Re, and reactive elements, such as Y, Zr, Hf, Si, and grain boundary strengtheners consisting of B, C, and combinations thereof. Bond coat 94 may be applied to substrate 74 and braze sheets 80 by a variety of processes described further herein, for example, by an ion plasma deposition process or a thermal spray process. Alternatively, bond coat 94 may be a diffusion aluminide bond coat, such as a coating having the chemical composition NiAl or PtAl, and bond coat 94 may be applied to the substrate 74 and braze sheets 80 through, for example, vapor phase aluminiding or chemical vapor deposition.

TBC 96 is any appropriate thermal barrier material. For example, without limitation, TBC 96 is a yttria-stabilized zirconia and may be applied to hot gas path component 28 through a physical vapor deposition process or thermal spray process as described herein. Alternatively, TBC 96 may be a ceramic, for example, without limitation, a thin layer of zirconia modified by other refractory oxides such as oxides formed from Group IV, V and VI elements or oxides modified by Lanthanide series elements such as La, Nd, Gd, Yb, and the like.

For particular configurations, coating 82 has a thickness in the range of 0.1 to 2.0 millimeters, and more particularly, in the range of 0.1 to 1 millimeter, and still more particularly 0.1 to 0.5 millimeters for industrial gas turbine components. However, other thicknesses may be utilized depending on the requirements for a particular hot gas path component 28. In alternative embodiments, hot gas path component 28 can be formed from a high temperature ceramic matrix composite (CMC) and coating 82 can include an environmental barrier coating (EBC) system that includes one or more material layers.

In the exemplary embodiment, the layers of coating 82 are deposited onto hot gas path component 28 using a variety of techniques. In one embodiment, coating 82 is disposed over at least a portion of outer surface 76 of substrate 74 by performing an ion plasma deposition. Briefly, ion plasma deposition includes placing a cathode formed of a coating material into a vacuum environment within a vacuum chamber, providing substrate 74 within the vacuum environment, supplying a current to the cathode to form a cathodic arc upon a cathode surface resulting in erosion or evaporation of coating material from the cathode surface, and depositing the coating material from the cathode upon the substrate outer surface 76. In one embodiment, the ion plasma deposition process includes a plasma vapor deposition process. Non-limiting examples of coating 82 include structural coatings, bond coatings, oxidation-resistant coatings, and thermal barrier coatings. In alternative embodiments, coating 82 is disposed over at least a portion of outer surface 76 of substrate 74 by performing a thermal spray process. For example, without limitation, the thermal spray process includes combustion spraying and/or plasma spraying. The combustion spraying process includes high velocity oxygen fuel spraying (HVOF) or high velocity air fuel spraying (HVAF). The plasma spraying process includes atmospheric (such as air or inert gas) plasma spray or low pressure plasma spray (LPPS), which is also known as vacuum plasma spray (VPS). Alternatively, techniques for depositing one or more layers of coating 82 include, without limitation, sputtering, electron beam physical vapor deposition, electroless plating, electroplating, and any other process that enables coating 82 to function as described herein.

In operation, pressurized air 24 flows through cooling system 42, and in particular, plenum 84, at a pressure generally higher than a pressure in inlet passage 64 and micro-channel 30. The pressure differential causes a portion of pressurized air 24 contained within cooling system 42 to flow into and through inlet passage 64, and from inlet passage 64 into and through micro-channel 30. Inlet passage 64 is configured to provide convection cooling to coating 82. For example, without limitation, inlet passage 64 is oriented generally perpendicular to braze sheet 80, which enables pressurized air 24 to impact on braze sheet 80 with a relatively high velocity, thus increasing the cooling effectiveness of pressurized air 24. As pressurized air 24 flows through inlet passage 64 and is provided to micro-channel 30, pressurized air 24 impacts on braze sheet 80, providing convection cooling of coating 82. After pressurized air 24 flows through micro-channel 30, cooling coating 82 and outer surface 76 of substrate 74, pressurized air 24 may be exhausted from micro-channels 30 through film cooling holes 86. For example, without limitation, in one embodiment pressurized air 24 is exhausted adjacent an outer surface 90 (shown in FIG. 7) of coating 82. Alternatively, micro-channels 30 do not include film cooling holes 86. In one particular embodiment, as shown with respect to one micro-channel 30 in FIG. 5, more than one film cooling holes 86 is spaced apart along a length of micro-channel 30 thus forming a trench exit micro-channel 30. In embodiments without cooling holes 86, pressurized air 24 may be exhausted off end wall edge 88 (shown in FIG. 5) of hot gas path component 28. In other embodiments, pressurized air 24 may be exhausted off of trailing edge 40 or leading edge 36 of airfoil 32 and into the path of hot gas flow 22. It should be noted that although film cooling holes 86 are shown in FIG. 5 as being substantially round, this is simply a non-limiting example. Film cooling holes 86 may be any shaped hole that enables film cooling holes 86 to function as described herein.

Figure 9:
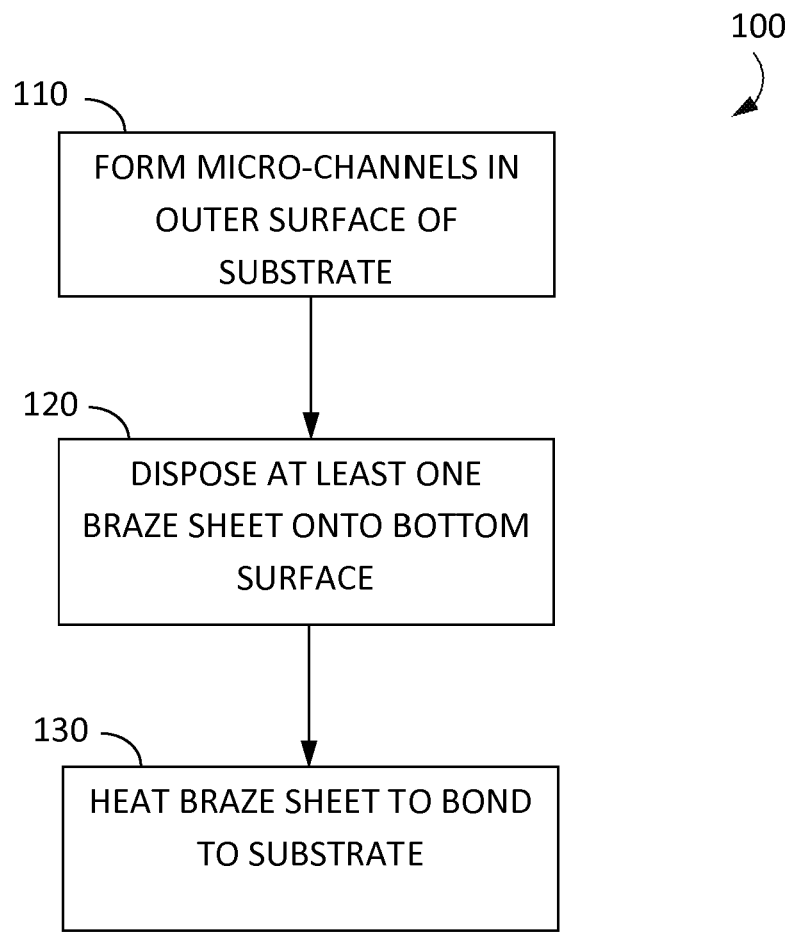
FIG. 9 is a method for providing a near-surface cooling micro-channels in the hot gas path component 28 of FIG. 3.

FIG. 9 is an exemplary method 100 for providing a near-surface cooling micro-channel 30 in hot gas path component 28 of FIG. 3. Method 100 includes forming 110 micro-channels 30 in outer surface 76 of substrate 74. More particularly, micro-channels 30 are formed in bottom surface 70 of each of recesses 68, which are formed in outer surface 76 of substrate 74. As discussed herein, micro-channels 30 can be machined into an already formed substrate 74, or cast into substrate 74 during fabrication of substrate 74. Method 100 further includes disposing 120 at least one braze sheet 80 onto bottom surface 70 of each of recesses 68, respectively. Finally, method 100 includes heating 130 braze sheet 80 to bond it to substrate 74. As described herein, heating of braze sheet 80 can occur for any temperature or range of temperatures and for any time to sufficiently bond braze sheet 80 to substrate 74. Furthermore, bonding can be achieved through any suitable means such as heating braze sheet 80 and/or substrate 74 through induction heating, friction welding, or the like.

The systems and methods described herein facilitate cooling of a hot gas path component 28 at a high heat transfer rate and with a relatively uniform temperature profile by specific geometry of micro-channels 30 that allow for improved cooling efficiency. The dimensions of micro-channels 30 are defined by limitations in the ability to fabricate them and apply braze sheet 80 without causing braze sheet 80 to collapse into micro-channels 30. The fabrication of micro-channels 30 and braze sheet 80 facilitate increasing the density and reducing the size of micro-channels 30 to optimize heat transfer efficiency. Forming micro-channels 30 into substrate 74 of hot gas path component 28 also facilitates reducing the cost of manufacturing while providing a high performance cooling system 42. Cooling system 42 facilitates increasing the life of hot gas path component 28 and enabling hot gas path component 28 to be utilized with higher temperature hot gas flows 22, thus increasing the performance and efficiency of gas turbine engine 10.

The systems and methods described herein are not limited to the specific embodiments described herein. For example, components of each apparatus and system may be utilized independently and separately from other components described herein. For example, the systems and methods may also be used in combination with other turbine systems, and are not limited to practice only with the gas turbine engines as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A method of providing micro-channels in a hot gas path component, the hot gas path component including a substrate having an exterior surface, said method comprising:

forming a first micro-channel in the exterior surface of the hot gas path component, the first micro-channel having a first channel width;

forming a second micro-channel in the exterior surface of the hot gas path component such that the second micro-channel is separated from the first micro-channel by a surface gap having a first width;

disposing a braze sheet comprising a first surface and an opposite second surface onto the exterior surface of the hot gas path component such that the braze sheet covers at least a portion of the first and second micro-channels, wherein the braze sheet is formed from a combined powder mixture of a high melting alloy powder and a low melting alloy powder, wherein a proportion of said low melting alloy powder varies between said first surface and said second surface; and heating the braze sheet to bond the braze sheet to at least a portion of the exterior surface of the hot gas path component.

2. The method in accordance with claim 1, wherein the first and second micro-channels have a substantially equal second width, and wherein the first width of the surface gap is equal to or greater than the second width of the first and second micro-channels.

3. The method in accordance with claim 1, wherein heating the braze sheet to bond the braze sheet to at least a portion of the exterior surface comprises heating the braze sheet to bond the braze sheet to the surface gap.

4. The method in accordance with claim 1, wherein a portion of the braze sheet suspended over each of the first and second micro-channels is subject to deformation at an operating temperature of the hot gas path component, and wherein forming the first and second micro-channels in the exterior surface comprises forming each of the first and second micro-channels with a second width configured to prevent the suspended portion of the braze sheet from drooping into the first and second micro-channels at the operating temperature of the hot gas path component.

5. The method in accordance with claim 1, wherein disposing the braze sheet onto the exterior surface comprises disposing the braze sheet onto the exterior surface, wherein the braze sheet is fabricated by combining a low melting alloy powder and a high melting alloy powder to form a combined powder mixture.

6. The method in accordance with claim 5, wherein the low melting alloy powder and the high melting alloy powder are mixed together at a weight ratio in the range between approximately 5:95 to approximately 95:5.

7. The method in accordance with claim 5, wherein said low melting point powder is present at a lower proportion than said high melting point powder near said first surface.

8. The method in accordance with claim 1, wherein forming the first and second micro-channels in the exterior surface comprises forming the first and second micro-channels with a second width in the range between approximately 0.040 in. (1.0 mm) and approximately 0.080 in. (2.0 mm).

9. The method in accordance with claim 1, further comprising forming a recess in the substrate, wherein the first and second micro-channels are formed in the recess.

10. The method in accordance with claim 9, wherein disposing the braze sheet onto the exterior surface of the hot gas path component comprises disposing the braze sheet within the recess such that the braze sheet covers at least of portion of the first and second micro-channels.

11. A hot gas path component comprising:
a substrate comprising a recess surface;
a first micro-channel formed in said recess surface;
a second micro-channel formed in said recess surface, said second micro-channel separated from said first micro-channel by a surface gap having a first width; and
a braze sheet comprising a first surface and an opposite second surface, said first surface bonded to at least a portion of said recess surface and covering at least a portion of said first and second micro-channels, said braze sheet formed from a combined powder mixture of a high melting alloy powder and a low melting alloy powder, wherein a proportion of said low melting alloy powder varies between said first surface and said second surface.

12. The hot gas path component in accordance with claim 11, wherein said first and second micro-channels have a substantially equal second width, and wherein said first width of said surface gap is equal to or greater than said second width of said first and second micro-channels.

13. The hot gas path component in accordance with claim 11, wherein said braze sheet is bonded to said surface gap.

14. The hot gas path component in accordance with claim 11, wherein a portion of said braze sheet suspended over each of said first and second micro-channels is subject to deformation at an operating temperature of said hot gas path component, and wherein each of said first and second micro-channels comprise a second width configured to prevent said suspended portion of said braze sheet from drooping into said first and second micro-channels at the operating temperature of said hot gas path component.

15. The hot gas path component in accordance with claim 11, wherein said low melting point powder is present at a higher proportion than said high melting point powder near said second surface.

16. The hot gas path component in accordance with claim 15, wherein said low melting alloy powder and said high melting alloy powder are mixed together at an average weight ratio in the range between approximately 5:95 to approximately 95:5.

17. The hot gas path component in accordance with claim 11, wherein said low melting point powder is present at a lower proportion than said high melting point powder near said first surface.

18. The hot gas path component in accordance with claim 11, wherein said first and second micro-channels comprises a second width in the range between approximately 0.040 in. (1.0 mm) and approximately 0.080 in. (2.0 mm).

19. The hot gas path component in accordance with claim 11, wherein said substrate comprises a recess formed in an outer surface of said substrate, said recess comprising said recess surface, and wherein said first and second micro-channels are formed within said recess.

20. The hot gas path component in accordance with claim 19, wherein said braze sheet is disposed within said recess and bonded to at least a portion of said recess surface and covering at least a portion of said first and second micro-channels.

* * * * *